United States Patent [19]

Takeuchi et al.

[11] 4,307,029

[45] Dec. 22, 1981

[54] PROCESS FOR PREPARING POLYMETHYLENE-POLYPHENYL POLYISOCYANATES

[75] Inventors: Koichi Takeuchi; Seiji Hasegawa; Shinobu Aoki, all of Kanagawa, Japan

[73] Assignee: Mitsui Toatsu Chemicals, Incorporated, Tokyo, Japan

[21] Appl. No.: 212,024

[22] Filed: Dec. 1, 1980

[30] Foreign Application Priority Data

Dec. 4, 1979 [JP] Japan ................................ 54/156353

[51] Int. Cl.$^3$ ............................................. C07C 118/00
[52] U.S. Cl. .................................. 260/453 P; 560/25
[58] Field of Search ....................... 260/453 P; 560/25

[56] References Cited

U.S. PATENT DOCUMENTS

| | | | |
|---|---|---|---|
| 2,409,712 | 10/1946 | Schweitzer | 260/453 P |
| 3,870,739 | 3/1975 | DeLaMater et al. | 260/453 |
| 3,919,278 | 11/1975 | Rosenthal | 260/453 P |
| 4,081,472 | 3/1978 | Tsumura et al. | 260/453 P |
| 4,146,727 | 3/1979 | Shawl et al. | 560/25 |
| 4,163,019 | 7/1979 | Mango | 260/453 P |

FOREIGN PATENT DOCUMENTS

| | | |
|---|---|---|
| 1243865 | 7/1967 | Fed. Rep. of Germany . |
| 54-88201 | 7/1979 | Japan . |
| 1247451 | 9/1971 | United Kingdom . |

OTHER PUBLICATIONS

J. Am. Chem. Soc., 78, 1946 (1956).
Bull, Chem. Soc., Japan, 33, 1137 (1960).

*Primary Examiner*—Dolph H. Torrence
*Attorney, Agent, or Firm*—Fisher, Christen & Sabol

[57] ABSTRACT

A process for preparing polymethylene polyphenyl polyisocyanates, in which N-phenyl carbamic acid esters are subjected to a condensation reaction with formaldehyde, and the reaction product containing polymethylene polyphenyl polycarbamic acid esters and unreacted N-phenyl carbamic acid esters is thermally decomposed to obtain polymethylene polyphenyl polyisocyanates.

16 Claims, 1 Drawing Figure

F I G. 1
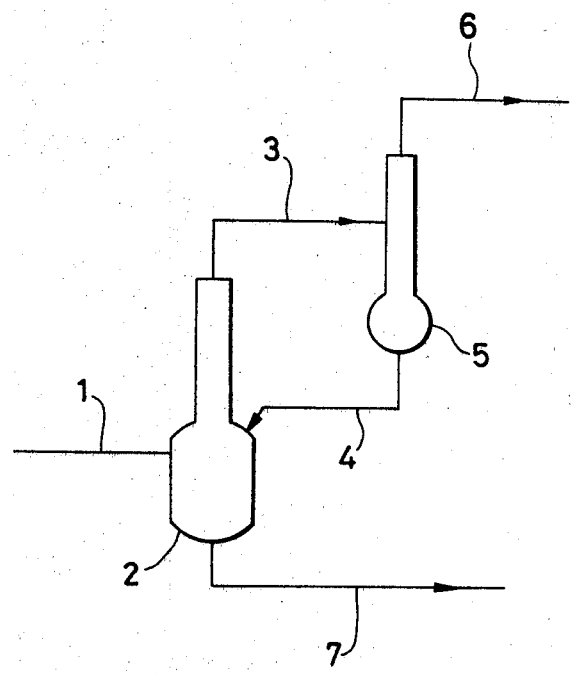

PROCESS FOR PREPARING POLYMETHYLENE-POLYPHENYL POLYISOCYANATES

BACKGROUND OF THE INVENTION

1. Field of the Invention

This invention relates to a novel and improved process for preparing polymethylene polyphenyl polyisocyanates by a thermal decomposition of polymethylene polyphenyl polycarbamic acid esters obtained by a condensation reaction of N-phenyl carbamic acid esters with formaldehyde.

2. Description of the Prior Art

Isocyanates are highly useful substances for practical use as starting materials mainly for polyurethanes, and particularly, for example, toluene diisocyanates and polymethylene polyphenyl polyisocyanates have been commercially produced on a large scale.

These isocyanates are industrially produced by a reaction of a primary amine with phosgene. However the above process has many problems to be solved such as the toxicity of phosgene, the treatment of hydrochloride produced during reaction and the corrosive properties of the latter. Accordingly, the establishment of a successful process for producing isocyanates without using phosgene is highly sought, and various studies seeking such have been made. However such a successful process has not been found or developed.

As an example of an attempt to achieve such process is a process for the preparation of isocyanates by a thermal decomposition of carbamic acid esters. Attention has been riveted to the above process as an effective process for the preparation of isocyanates because a process for rather easily preparing carbamic acid esters directly from a nitro compound has recently been developed. However, the conventional thermal decomposition process has not been put to practical use because it has problems such as difficulties in the industrialization thereof and disadvantages incurred from the economical standpoint with respect to yield of isocyanates, reaction rate, materials for apparatus, temperature control, removal of by-products, and the like.

The greatest problem in the thermal decomposition of carbamic acid esters is that some unfavorable side reactions take place, and that isocyanates thus obtained are polymerized under reaction conditions for the thermal decomposition and react with carbamic acid esters, intermediate products, by-products or the like to form more complicated high-boiling by-products due to the high reactivity of such isocyanates. The formation of these high-boiling by-products is increased particularly in the case where polyisocyanates are prepared from polycarbamic acid esters and the by-product increase multiplies the problems.

The conventional process of the thermal decomposition of carbamic acid esters is classified into two major processes, one carried out in the gaseous phase at high temperatures and the other carried out in the liquid phase at relatively low temperatures. With respect to the first process, British Pat. No. 1,247,451 discloses a process in which the thermal decomposition reaction is carried out at a temperature of 400° to 600° C. in the presence of a Lewis acid. However, such process has disadvantages such as low yields, decomposition of catalyst at high temperature, corrosion of materials and an increased amount of polymer by-products. As an improved gaseous phase process over the above process, U.S. Pat. No. 3,870,739 discloses a process in which the reaction is carried out within 15 seconds of residence time at a temperature of 350° to 550° C. under reduced pressures. However, such process has the disadvantages that carbamic acid esters as starting materials have to be fed into a reaction site in the form of powder and that solid polymer by-products are also formed and accumulate within the reactor and condenser after the reaction is carried out for a long period of time to such an extent that continuous operation becomes difficult. Such process also presents great difficulties in being put into practical use, because the starting material must be supplied with a large amount of heat for the endothermic reaction required for the thermal decomposition in a short period of time.

On the other hand, many attempts have been made using a process for thermally decomposing carbamic acid esters in the liquid phase at a temperature comparatively lower than in the gaseous phase process. For example, U.S. Pat. No. 2,409,712 discloses a process in which N-lauryl carbamic acid ethoxyethyl esters are thermally decomposed under the conditions of 210°–230° C./2 mmHg in order to obtain the corresponding isocyanates at a yield of 75 percent. However, such yield is too low for such process to be put into practical use. Further, descriptions in J. Amer. Chem. Soc., 78, 1946(1956) and Bull. Chem. Soc., Japan 33 1137(1960) suggest that carbamic acid esters can be thermally decomposed in an inert solvent such as various hydrocarbons, ethers and nitrobenzene. However, the above references describe only the result of studies made concerning the reaction rate and teach nothing about isolation of isocyanates, yields of isocyanates and side reactions.

Recently processes such as the following have been suggested: a process in which carbamic acid esters are thermally decomposed at a temperature from 175° to 350° C. in the presence of a solvent such as hydrocarbons, ethers, ketones and esters, and the resulting isocyanates and alcohol are recovered separately as disclosed in U.S. Pat. No. 3,919,278; a process in which the thermal decomposition is carried out in the presence of a catalyst such as compounds of zinc, tin and the like in an inert solvent as disclosed in U.S. Pat. No. 4,081,472; and a process in which the thermal decomposition is carried out by the use of alkaline earth metal as catalyst in order to increase the yield of the product as disclosed in Japanese patent Laid-Open publication No. 88,201/1979. According to the above processes, yields of isocyanates are considerably increased, but rather large amounts of tarry high-boiling substances are still formed as by-products. Formation of such tarry high-boiling substances as by-products is considerably increased especially in the case where polyisocyanates are prepared by the thermal decomposition of polycarbamic acid esters. Such tarry high-boiling by-product substances are unseparable, are contained in the product and are responsible for such a deterioration of product quality that satisfactory polyurethanes are not produced from the product thus obtained.

The above processes are all relates to a process for the preparation of isocyanates, such as phenyl isocyanates, toluene diisocyanates and hexamethylene diisocyanates, which are recoverable by distillation after thermal decomposition and are consequently unsuitable for the preparation of a product containing high-boiling polyisocyanates, such as polymethylene polyphenyl polyisocyanates, which are unrecoverable by distillation under normal conditions.

SUMMARY OF THE INVENTION

An object of this invention is to provide a novel, economical process for the preparation of polymethylene polyphenyl polyisocyanates.

Another object of this invention is to provide a process for the preparation of high-quality polymethylene polyphenyl polyisocyanates in which the high-quality polymethylene polyphenyl polyisocyanates are obtained in high yields.

This invention provides a process for the preparation of polyisocyanates which comprises subjecting N-phenyl carbamic acid esters having general formula (I):

wherein R represents a lower alkyl group having 1 to 4 carbon atoms, to condensation reaction with formaldehyde or a formaldehyde-producing compound in the presence of an acid catalyst, subjecting the resultant polycarbamic acid esters having general formula (II):

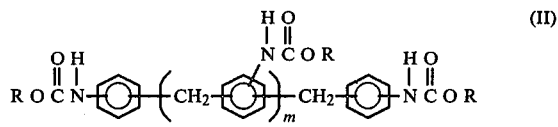

wherein R is as defined in general formula (I) and m represents 0 or an integer of from 1 to 5, to thermal decomposition with unreacted N-phenyl carbamic acid esters contained therein in an organic solvent under a boiling pressure of the solvent at a temperature of 200° to 350° C., and separating resulting alcohol and unreacted N-phenyl isocyanates as vapor from the formed liquid polyisocyanates.

According to the process of this invention, formation of tarry high-boiling substances as by-products, which are formed in large quantities in the conventional thermal decomposition process, is suppressed to such an extent that high-quality polymethylene polyphenyl polyisocyanates are obtained in high yields.

The process of this invention results in a higher reaction rate, a larger production capacity and a smaller plant compared with the conventional thermal decomposition process. Further, this invention provides a more economical production process because the step of removing unreacted materials in the condensation reaction can be dispensed with.

Polymethylene polyphenyl polyisocyanates are of such a high quality as to be usable as starting materials in the preparation of polyurethanes in the same manner as polyisocyanates obtained by the conventional phosgenization process.

BRIEF DESCRIPTION OF THE DRAWING

FIG. 1 is a flow sheet showing one embodiment for the practice of this invention.

DETAILED DESCRIPTION OF THE INVENTION

According to the process of the present invention, N-phenyl carbamic acid esters represented by the general formula (I) are subjected to condensation reaction with formaldehyde or a formaldehyde-producing compound to obtain polycarbamic acid esters represented by the general formula (II) and the resultant condensation products containing unreacted N-phenyl carbamic acid esters are then subjected to thermal decomposition in an organic solvent.

Specific examples of N-phenyl carbamic acid esters represented by the general formula (I) include:
N-phenyl carbamic acid methyl ester,
N-phenyl carbamic acid ethyl ester,
N-phenyl carbamic acid n-propyl ester,
N-phenyl carbamic acid isopropyl ester,
N-phenyl carbamic acid n-butyl ester, and
N-phenyl carbamic acid isobutyl ester.

N-phenyl carbamic acid esters used in the process of the present invention can readily be prepared by reacting nitrobenzene with carbon monoxide in alcohol in the presence of a noble metal catalyst or a catalyst including a Lewis acid as the major component. N-phenyl carbamic acid esters thus obtained may be separated by distillation, by extraction, or the like for use as the starting materials. The condensation reaction of N-phenyl carbamic acid esters with formaldehyde is carried out in the presence of a Lewis acid or a protonic acid in order to obtain polycarbamic acid esters represented by general formula (II).

In place of the formaldehyde used in the condensation reaction, formaldehyde-producing compounds such as paraformaldehyde, trioxane, methylal and other formals, may be used. The amount of formaldehyde or formaldehyde-producing compounds is in the range from 0.1 to 10 moles, preferably 0.2 to 2.0 moles, as formaldehyde per mole of the starting N-phenyl carbamic acid ester.

Examples of the acid used in the process of the present invention include: a mineral acid such as hydrochloric acid, sulfuric acid, phosphoric acid and boric acid; and an organic acid such as formic acid, acetic acid, oxalic acid and toluenesulfonic acid. The so-called super acids such as hydrobromic acid, perchloric acid, chlorosulfonic acid, methanesulfonic acid and trifluoromethanesulfonic acid are also effectively used. The acids described above are all protonic acid.

Examples of other effective acids include: ion exchange resins containing an acid group such as carboxyl group and sulfonic acid group; and, Lewis acid such as boron trifluoride, iron chloride, aluminium chloride, zinc chloride, titanium chloride and antimony pentafluoride.

In the case of a protonic acid such as the above-described mineral acids, organic acids or super acids, the amount of the acid used is in the range of 0.001 to 10 moles, preferably 0.01 to 4 moles, per mole of N-phenyl carbamic acid ester as the raw material. In the case where these acids are used as an aqueous solution, the acids are desirably used in a concentration of 10 to 95 percent by weight, preferably 20 to 80 percent by weight, based on the amount of water in the reaction system. If the concentration is less than 10 percent by weight, the reaction rate becomes so low that the aforesaid process is substantially unavailable as an industrial process. If the concentration is higher than 95 percent by weight, an unfavorable side reaction such as hydrolysis of the raw material takes place.

The condensation reaction is carried out by heating with an acid catalyst in the absence of a solvent or in the presence of a suitable solvent. Examples of the suitable solvent include, aliphatic hydrocarbons such as hexane, and heptane; alicyclic hydrocarbons such as cyclopentane, cyclohexane and methylcyclohexane; aromatic hydrocarbons such as benzene, toluene and xylene; alkyl-, halogen- and nitrosubstituted compounds thereof; halogenated hydrocarbons such as chloroform, methylene dichloride, carbon tetrachloride, dichloroethane, trichloroethane and tetrachloroethane; fatty acid alkyl esters such as ethyl acetate; ethers such as diethyl ether, diisopropyl ether, dioxane and tetrahydrofuran; and the like. The amount of solvents used is in a ratio by weight of 0.1 to 100, preferably 0.2 to 50, to the amount of N-phenyl carbamic acid ester as a raw material.

The reaction temperature is generally in the range of from 10° to 150° C., preferably 20° to 120° C. At higher temperatures, unfavorable side reactions such as hydrolysis take place.

According to the condensation reaction the condensation products with various ratios of the resultant nuclear compounds can be obtained depending on the reaction conditions. Generally, the condensation product is composed of 30 to 80 percent by weight of a compound represented by the general formula (II) in which m is 0, or methylene bis-(phenyl carbamate), and the balance of compounds represented by the general formula (II) in which m is one or more, or polynuclear polycarbamic acid esters having 3 or more phenyl groups. For example, polycarbamic acid ethyl esters, which are obtained by subjecting N-phenyl carbamic acid ethyl ester to condensation reaction with 35% aqueous formaldehyde solution, contain about 70 percent by weight of binuclear bis-(ethylcarbamate phenyl)-methane and about 30 percent by weight of tri- or higher nuclear polycarbamic acid ethyl ester compounds in the reaction product except for the unreacted N-phenyl ethyl carbamate. Polycarbamic acid ethyl esters, which are obtained by the condensation reaction as above in the presence of boron trifluoride etherate, contain about 80 percent by weight of binuclear compounds and about 20 percent by weight of tri- or higher nuclear polycarbamic acid ethyl ester compounds. The ratio between the amount of binuclear compounds and the amount of tri- or higher nuclear compounds can readily be varied depending on the type of catalyst, the amount of formalin, and the like.

The polycarbamic acid esters thus obtained contain unreacted N-phenyl carbamic acid esters depending on the various reaction conditions. The complete removal of unreacted N-phenyl carbamic acid esters from polycarbamic acid esters requires severe conditions. For example, even if the polycarbamic acid esters thus obtained are subjected to the distillation under a reduced pressure of 1 to 2 mmHg at a temperature of from 145° to 150° C., unreacted N-phenyl carbamic acid esters remains therein in an amount of 5 to 10 percent by weight. At higher temperatures of 160° to 170° C., unreacted N-phenyl carbamic acid esters can be removed, but polycarbamic acid esters are thermally decomposed to form tar with the result that the content of isocyanate groups is decreased. On the other hand, any such pressure may be reduced further, but the further reduction in pressure is industrially uneconomical.

According to the process of the present invention, N-phenyl carbamic acid esters formed by the condensation reaction are subjected to thermal decomposition reaction after removal of the catalyst and solvent simply by the conventional procedure without removing the unreacted N-phenyl carbamic acid esters. The content of unreacted N-phenyl carbamic acid esters is widely variable in the thermal decomposition, but is normally up to 50 percent by weight, preferably up to 20 percent by weight, because a higher content causes an increase in unnecessary service expenditures and increase of the plant size.

The organic solvent used in the thermal decomposition reaction of the process of the present invention is an inert solvent that can dissolve polycarbamic acid ethers and polyisocyanates at room temperature or at least at the reaction temperature. However, a solvent that has a boiling point which is too high is unfavorable in that removal of the solvent is difficult and causes retrogradation of the isocyanate group and pollution of the polyisocyanate product with a resulting reduction in its commercial value. The solvent is preferably removed by distillation after completion of the thermal decomposition reaction, so the solvent preferably has a boiling point up to 300° C. under atmospheric pressure. If an inert solvent has a boiling point higher than 300° C., the inert solvent should preferably be a solvent that can form an azeotropic point of up to 300° C. under atmospheric pressure with another solvent as a third component. The solvent used as the third component may also be an inert solvent having a boiling point up to 300° C. in order to lower the boiling point of the inert solvent. Examples of preferable inert solvents include: unsubstituted or alkyl, nitro or halogen substituted aromatic hydrocarbons, such as benzene, naphthalene, alkyl benzene, chlorobenzene, dichlorobenzene, nitrobenzene, chloronaphthalene and the like; diphenyls, diphenyl methanes and terphenyls; aromatic ethers such as diphenyl ether and diphenyl thioether; esters such as dibutyl phthalate and dioctyl phthalate; and the like. Mixtures thereof may also be used.

The concentration of the starting material in the solvent is in the range of 1 to 30 percent by weight, preferably 5 to 20 percent by weight, in order to suppress side reactions such as reactions between the isocyanates thus formed, reactions of the isocyanates with the starting material, and the like.

The thermal decomposition reaction is usually carried out in the presence of a catalyst. However, catalysts composed of a heavy metal or a heavy metal compound are unfavorable because they have adverse effects on the formation of urethane foam. Particularly, iron, cobalt, and nickel are considered to be unfavorable as disclosed in German Pat. No. 1,243,865. The presence of heavy metals further promote the retrogradation of isocyanate group during the step of removing solvent in the preparation of polyisocyanate product. Accordingly, preferred catalysts used in the process of the present invention include zinc and aluminum. These catalysts are usually used as metallic compounds which are readily soluble in the inert solvent. Examples of effective metallic compounds include zinc chloride, zinc acetate, zinc oxide, zinc naphthenate, zinc stearate and aluminum chloride.

The amount of the catalyst is in the range of 5 to 100 ppm, preferably 40 to 90 ppm, as metal based on the raw material. A higher catalyst content causes retrogradation of the isocyanate group.

The reaction temperature for the thermal decomposition reaction is preferably in the range of 200° to 350° C. at a temperature lower than 200° C. the thermal decomposition rate becomes so low that allphanate linkages are increased, and at 350° C. or higher an increase of polymers occurs due to side reactions.

The reaction pressure is determined by the kind of solvent used, but it is up to 10 kg/cm²G and preferably atmospheric pressure or lower is used. The reaction needs to be effected with violent boiling of the solvent under a boiling pressure of the solvent.

N-phenyl carbamic acid esters are decomposed to form N-phenyl isocyanates by the aforesaid reaction. The N-phenyl isocyanates are taken out of the system as vapor without using any other carriers either to be recovered as useful N-phenyl isocyanates by partial condensation from alcohol, or to be condensed with alcohol for the subsequent reaction to form N-phenyl carbamic acid esters, which may be recovered as a raw material. On the other hand, the polyisocyanates thus formed are subjected to removal of solvent by conventional distillation to obtain a polyisocyanate product. If desired, methylene bis(phenylisocyanate) may be separated from a polyisocyanate composition by distillation in the same manner as the conventional procedure.

The process of the present invention may be effected by any method as long as the respective reaction conditions are satisfied. However, the simplest and most economical method is a method where the reaction is effected in a reactor fitted with a reflux column while refluxing the inert solvent to remove alcohol.

Referring to FIG. 1, one embodiment in the industrial practice of the process of the present invention is illustrated. In FIG. 1, an organic solvent containing polycarbamic acid esters dissolved therein is fed to reactor 2 through line 1 and the esters are subjected to thermal decomposition. The resultant alcohol and N-phenyl isocyanates are distilled off along with a part of the solvent from the top of reactor 2 and passed via line 3 to still 5. In the still 5, solvent, alcohol and N-phenyl isocyanates are separated such that the solvent is passed via line 4 to reactor 2, and the alcohol and N-phenyl isocyanates are discharged out of the reaction system via line 6. Polymethylene polyphenyl polyisocyanates are obtained via line 7. It is convenient for the effective separation of N-phenyl isocyanates to use a solvent that has a boiling point which is between the respective boiling points of the alcohol and N-phenyl isocyanates. In the above case, an additional fractionating column may be added for further separation. Methylene bis(phenyl isocyanate) is also carried with the organic solvent in a very small amount, but the methylene bis(phenyl isocyanate) is recycled to the reactor with the solvent without any problems resulting which have to be solved.

The present invention is illustrated in more detail by the following examples. The chemical names of the abbreviations in the examples are shown below:

| Abbreviation | Chemical name |
| --- | --- |
| MDI | Methylene bis(phenyl isocyanate) represented by the formula:<br>OCN–⟨○⟩–CH₂–⟨○⟩–NCO |
| MIC | Methylene monocarbamate monoisocyanate represented by the general formula:<br>$ROCN(H)$–⟨○⟩–CH₂–⟨○⟩–NCO |
| MDC | Methylene bis(phenyl carbamate) represented by the general formula: |

| Abbreviation | Chemical name |
| --- | --- |
| | $ROC(O)N(H)$–⟨○⟩–CH₂–⟨○⟩–$N(H)C(O)OR$ | wherein R is as defined in the general formula (I).

| Trinuclear isocyanates | Isocyanates represented by the general formula (II) where m = 1. |
| --- | --- |
| Trinuclear carbamates | Carbamates represented by the general formula (I) where m = 1. |

Analysis of the carbamates and isocyanates is effected by high speed liquid chromatogarphy.

EXAMPLE 1

Into a 6-liter flask, 500 g of N-phenyl ethyl carbamate, 45 g of paraformaldehyde, 210 g of boron trifluoride etherate [BF₃(C₂H₅)O] as a catalyst and 1500 cc of benzene as a solvent are charged. The materials are reacted with agitation in a stream of nitrogen. The reaction temperature is 80° C. and the reaction time is 5 hours. After completion of the reaction, the resulting mixture is washed with water to remove the catalyst, and the benzene is distilled off by using a rotary evaporator to obtain a mixture of polycarbamic acid ethyl esters containing unreacted phenyl ethyl carbamates. The composition of the mixture is shown below.

| | Composition (% by weight) |
| --- | --- |
| Unreacted N-phenyl ethyl carbamate | 16.3 |
| MDC | 41.0 |
| Trinuclear carbamates | 21.1 |
| Other polyfunctional polyethyl carbamates | 20.7 |

Into a 1-liter three-necked flask fitted with a Dimroth condenser having an inner diameter of 25 mm and a length of 500 mm, 30 g of the condensation product thus obtained, 600 g of diphenyl ether as an organic solvent, and 2.4 mg of zinc chloride as a catalyst are charged. The materials are subjected to decomposition reaction under such conditions that diphenyl ether is kept boiling violently at 253° C. at a pressure of 700 to 720 mmHg. The condenser is air-cooled without heat retention, and is kept at such a condition that the organic solvent is under reflux. The reaction proceeds with the resultant alcohol and N-phenyl isocyanates being discharged from the top of the condenser along with a part of the solvent. The reaction is stopped 90 minutes after the temperature reaches the reaction temperature of 253° C. and boiling starts, during which time the temperature at the top of the condenser is initially 80° C. and finally becomes 250° C. A product having the following composition is obtained, with the organic solvent being excluded,

| | Composition (% by weight) |
| --- | --- |
| MDI | 44.2 |
| MIC | <1.0 |
| Trinuclear isocyanates | 24.2 |
| Other polyfunctional | |

|  | Composition (% by weight) |
|---|---|
| polyisocyanates | 30.6 |

The yield based on the binuclear compounds is 98 percent. The N-phenyl isocyanates are recovered at a rate of 98 percent as N-phenyl carbamates recombined in the alcohol distillate.

EXAMPLE 2

Into a 6-liter flask, 500 g of N-phenyl methyl carbamate, 45 g of paraformaldehyde, 210 g of $[BF_3(C_2H_5)O]$ as a catalyst and 1500 cc of benzene as a solvent are charged. The materials are reacted with agitation in a stream of nitrogen. In spite of the deposition of crystals on the way, the reaction is continued. The reaction temperature is 82° C. and the reaction time is 5 hours. After completion of the reaction, the crystals and the organic layer are separately washed with water and then are joined together to obtain a condensation product. The composition thereof is shown below:

|  | Composition (% by weight) |
|---|---|
| Unreacted N-phenyl methyl carbamate | 16.4 |
| MDC | 41.2 |
| Trinuclear carbamates | 21.1 |
| Other polyfunctional polymethyl carbamates | 21.3 |

Into a 1-liter three-necked flask fitted with a Dimroth condenser having an inner diameter of 25 mm and a length of 500 mm, 30 g of the condensation product thus obtained, 600 g of diphenyl ether as an organic solvent and 2.4 mg of zinc chloride as a catalyst are charged. The materials reacted under reflux of the diphenyl ether at 253° C. at a pressure of 700 to 720 mmHg. The reaction is stopped 70 minutes after the temperature reaches the reaction temperature of 253° C. and boiling starts. The composition of the resulting condensation product is shown below:

|  | Composition (% by weight) |
|---|---|
| MDC | 46.1 |
| MIC | Trace |
| Trinuclear compounds | 24.9 |
| Other polyfunctional polyisocyanates (excluding the organic solvent) | 29.0 |

The yield based on the binuclear compounds is 97.8 percent. The N-phenyl isocyanates are recovered at a rate of 92 percent as N-phenyl carbamates recombined in the alcohol distillate.

EXAMPLE 3

Into a 1-liter three-necked flask fitted with a Dimroth condenser having an inner diameter of 25 mm and a length of 500 mm, 30 g of the condensation product obtained in Example 1, 600 g of diphenyl ether as an organic solvent and 2.4 mg of zinc chloride as a catalyst are charged. The materials are subjected to the decomposition reaction while being kept boiling at 220° C. under a pressure of 350 to 370 mmHg. The reaction is stopped 6 hours after the temperature reaches the reaction temperature of 220° C. and boiling starts. The composition of the reaction product is shown below:

|  | Composition (% by weight) |
|---|---|
| MDI | 42.0 |
| MIC | 1.2 |
| Trinuclear compounds | 23.5 |
| Other polyfunctional polyisocyanates (excluding the organic solvent) | 33.3 |

The yield based on the binuclear compounds is 89.2 percent. The N-phenyl isocyanates are recovered at a rate of 95 percent as N-phenyl carbamates recombined in the alcohol distillate.

COMPARATIVE EXAMPLE 1

The decomposition reaction in Example 3 is repeated except that the pressure during the thermal decomposition is atmospheric pressure. The reaction is stopped 6 hours after the temperature reaches the reaction temperature of 220° C. and boiling starts. The composition of the reaction product is shown below:

|  | Composition (% by weight) |
|---|---|
| MDI | 21.1 |
| MIC | 19.0 |
| Tri- or higher nuclear carbamates, isocyanates (excluding the organic solvent) | 59.9 |

The decomposition reaction in comparative Example 1 is repeated except that nitrogen is bubbled into the decomposition flask as a carrier gas at a rate of 1 l/m during the thermal decomposition reaction. The reaction is carried out for 6 hours. The reaction product is analyzed by high speed liquid chromatography to obtain the following results:

|  | Composition (% by weight) |
|---|---|
| MDI | 31.9 |
| MIC | 16.7 |
| Tri- or higher nuclear carbamates, isocyanates | 48.1 |

The yield based on the binuclear compounds is 73.1 percent.

EXAMPLE 4

Into a distillation flask, 100 g of the condensation product obtained in Example 2 is charged. The N-phenyl carbamates contained therein are distilled off at a temperature of 145° to 150° C. at a pressure of 2 mmHg to obtain a mixture of polycarbamic acid esters having the following composition:

|  | Composition (% by weight) |
|---|---|
| Unreacted N-phenyl carbamates | 5.8 |
| MDC | 45.5 |
| Trinuclear compounds | 23.5 |
| Other polyfunctional |  |

|  | Composition (% by weight) |
| --- | --- |
| polycarbamates | 25.1 |

The condensation product thus obtained is subjected to the thermal decomposition reaction in the same manner as in Example 1. Then the diphenyl ether is distilled off by using a rotary evaporator under a pressure of 3 to 4 mmHg at 125° C. This is followed by distillation under a pressure of 2 to 3 mmHg at 135° C. to obtain a polyisocyanate composition having the following composition:

|  | Composition (% by weight) |
| --- | --- |
| MDI | 44.1 |
| MIC | trace |
| Trinuclear compounds | 22.9 |
| Other polyfunctional polyisocyanates | 33.0 |

The content of the isocyanate groups in the polyisocyanate composition is 28.3 percent.

What is claimed is:

1. A process for preparing polymethylenepolyphenyl polyisocyanates which comprises subjecting N-phenyl carbamic acid esters having the formula (I):

(I)

wherein R is a lower alkyl group having 1 to 4 carbon atoms, to condensation reaction with formaldehyde or a formaldehydeproducing compound in the presence of an acid catalyst, subjecting the reaction product containing the resulting polycarbamic acid esters having the formula (II):

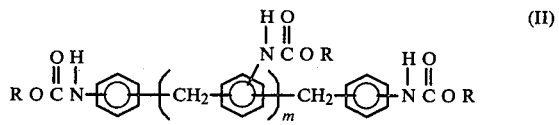

(II)

wherein R is as defined in the formula (I) and m is 0 or an integer from 1 to 5, and the unreacted N-phenyl carbamic acid esters to thermal decomposition in an organic solvent under a boiling pressure of the solvent at a temperature from 200° to 350° C., and separating the resulting alcohol and the unreacted N-phenyl isocyanates as vapor from the formed liquid polyisocyanates.

2. A process as claimed in claim 1 wherein R is selected from the grop consisting of methyl, ethyl, n-propyl, iso-propyl, n-butyl and iso-butyl.

3. A process as claimed in claim 1 wherein R is methyl or ethyl.

4. A process as claimed in claim 1 wherein said acid catalyst used in the condensation reaction is a protonic acid or a Lewis acid.

5. A process as claimed in claim 4 wherein said protonic acid is selected from the group consisting of hydrochloric acid, sulfuric acid, phosphoric acid, acetic acid, toluenesulfonic acid, methanesulfonic acid, trifluoromethane sulfonic acid and an ion exchange resin having a sulfonic acid group.

6. A process as claimed in claim 4 wherein said Lewis acid used in the condensation reaction is selected from the group consisting of boron trifluoride, iron chloride and antimony pentafluoride.

7. A process as claimed in claim 1 wherein the content of unreacted N-phenyl carbamic acid esters subjected to thermal decomposition in said reaction product is up to 50 percent by weight.

8. A process as claimed in claim 1 wherein said organic solvent has a boiling point up of to 300° C. under atmospheric pressure and is substantially inert in the thermal decomposition reaction.

9. A process as claimed in claim 8 wherein said organic solvent is selected from the group consisting of unsubstituted or alkyl-, halogen- or nitro-substituted aromatic hydrocarbons, aromatic ethers and aromatic esters.

10. A process as claimed in claim 8 wherein said organic solvent is at least one member selected from the group consisting of chlorobenzene, dichlorobenzene, chloronaphthalene, nitrobenzene, diphenyl ether, diphenylmethane terphenyl, dibutyl phthalate and dioctyl phthalate.

11. A process as claimed in claim 8 wherein said organic solvent is diphenyl ether.

12. A process as claimed in claim 1 wherein the concentration of the condensation product based on the solvent in the thermal decomposition reaction is in the range of from 1 to 30 percent by weight.

13. A process claimed in claim 1 wherein said catalyst used in the thermal decomposition reaction is zinc, aluminum or compounds thereof.

14. A process as claimed in claim 1 wherein said catalyst used in the thermal decomposition reaction is selected from the group consisting of zinc, zinc chloride, zinc oxide, zinc acetate, zinc naphthenate and zinc stearate.

15. A process as claimed in claim 1 wherein said condensation reaction is carried out by use of N-phenyl carbamic acid alkyl ester wherein R is methyl group or ethyl group, in the presence of an acid catalyst selected from the group consisting of hydrochloric acid, sulfuric acid, methanesulfonic acid, trifluoromethane sulfonic acid, boron trifluoride, iron chloride and antimony pentafluoride, and the resulting reaction product containing up to 50 percent by weight of unreacted N-phenyl carbamic acid esters is subjected to thermal decomposition reaction at a concentration from 1 to 30 percent by weight in a thermal decomposition solvent having a boiling point of up to 300° C. under atmospheric pressure.

16. A process as claimed in claim 15 wherein N-phenyl carbamic acid ethyl ester and boron trifluoride as the catalyst are used in said condensation reaction, and wherein diphenyl ether as the thermal decomposition solvent and zinc chloride as the catalyst are used in said thermal decomposition reaction.

* * * * *